United States Patent [19]
Bedi

[11] Patent Number: 5,327,862
[45] Date of Patent: Jul. 12, 1994

[54] MULTI-PORT FILTER MOUNTING ADAPTER AND FITTING MOUNTED TO SAME FOR EXPEDITING REMOVAL OF OIL FROM INTERNAL COMBUSTION ENGINE ASSOCIATED THEREWITH AND METHOD FOR ACCOMPLISHING SAME

[75] Inventor: Ram D. Bedi, Birmingham, Mich.

[73] Assignee: K.J. Manufacturing Co., Wixom, Mich.

[21] Appl. No.: 68,973

[22] Filed: May 28, 1993

[51] Int. Cl.$^5$ .............................................. F01M 1/00
[52] U.S. Cl. ................................ 123/196 R; 184/1.5; 184/105.3
[58] Field of Search ........... 123/196 R, 196 A, 196 S; 184/1.5, 105.3, 106, 109; 251/149.6

[56] References Cited

U.S. PATENT DOCUMENTS

| | | | |
|---|---|---|---|
| 1,766,847 | 6/1930 | Tibbetts | 184/8.24 |
| 2,394,236 | 2/1946 | Eastman | 251/149.6 |
| 3,387,621 | 6/1968 | Schaff | 251/149.6 |
| 3,448,746 | 6/1969 | Buller | 134/102 |
| 4,193,442 | 3/1980 | Vian | 165/35 |
| 4,239,184 | 12/1980 | Dudar | 251/149.6 |
| 4,369,110 | 1/1983 | Picek | 210/180 |
| 4,433,656 | 2/1984 | Norwood | 123/196 A |
| 4,452,695 | 6/1984 | Schmidt | 123/196 A |
| 4,479,468 | 10/1984 | Norwood, Sr. | 123/196 A |
| 4,745,894 | 5/1988 | Laipply et al. | 123/196 S |
| 4,884,660 | 12/1989 | Bedi | 184/1.5 |
| 4,940,209 | 7/1990 | Fish | 123/196 R |
| 4,951,784 | 8/1990 | Bedi | 184/1.5 |
| 4,967,776 | 11/1990 | Folmar | 134/57 R |
| 4,976,233 | 12/1990 | Bedi et al. | 123/196 R |
| 5,044,334 | 9/1991 | Bedi | 123/196 R |
| 5,048,578 | 9/1991 | Dorf et al. | 184/106 |
| 5,062,398 | 11/1991 | Bedi et al. | 123/196 R |
| 5,074,380 | 12/1991 | Bedi et al. | 184/1.5 |
| 5,090,376 | 2/1992 | Bedi | 123/196 R |
| 5,094,201 | 3/1992 | Bedi | 123/196 R |
| 5,122,020 | 6/1992 | Bedi | 411/302 |
| 5,145,033 | 9/1992 | Bedi et al. | 184/1.5 |
| 5,154,775 | 10/1992 | Bedi | 134/22.1 |
| 5,209,198 | 5/1993 | Bedi | 123/196 R |
| 5,236,064 | 8/1993 | Wagoner | 123/196 S |

Primary Examiner—Noah P. Kamen
Attorney, Agent, or Firm—Basile and Hanlon

[57] ABSTRACT

An assembly for convenient installation on an internal combustion engine for facilitating engine cleaning and oil change and method for using the same which includes an oil filter mounting adapter interposed between the oil filter unit and the oil filter boss located on the engine and a fluid egress assembly mounted in the drain opening of the oil pan. The oil filter mounting adapter is configured to be readily mountable in engine compartments having significant space constraints. The oil filter mounting adapter is composed of a spin-on sandwich adapter and a fluid coupling assembly. The fluid coupling assembly includes a quick connect nipple which is releasably matingly engageable with mating fitting on an external fluid supply source. The fluid egress fitting also includes a quick connect nipple releasably matingly engageable with a mating fitting on a fluid removal hose or conduit.

1 Claim, 4 Drawing Sheets

MULTI-PORT FILTER MOUNTING ADAPTER AND FITTING MOUNTED TO SAME FOR EXPEDITING REMOVAL OF OIL FROM INTERNAL COMBUSTION ENGINE ASSOCIATED THEREWITH AND METHOD FOR ACCOMPLISHING SAME

BACKGROUND OF THE INVENTION

I. Field of the Invention:

The present invention relates to a device for use on an internal combustion engine to facilitate rapid removal of spent motor oil from the associated engine and oil reservoir, empty the oil filter or filters and introduction of fresh motor oil into the engine to replace that which was removed. More particularly, this invention relates to interrelated devices which enable spent oil to be removed from the oil pan reservoir in a safe, rapid, self-contained and clean manner and replaced with fresh motor oil via the region proximate to the engine oil filter unit. Finally, this invention relates to a method for changing motor oil in an internal combustion engine and, optionally, flushing and cleaning the motor oil reservoir, crankcase components, and oil filter in an internal combustion engine.

II. Description of the Relevant Art:

The necessity of routine oil changes for the trouble-free operation of an automotive vehicle is well documented. Such maintenance is one of the most cost-effective measures which can be taken toward preserving and prolonging the useful life of an internal combustion engine. Such measures reap additional rewards in the environmental arena as it is also well documented that proper engine maintenance can positively effect vehicle emissions and the like.

Unfortunately, the process of changing engine oil can be both time-consuming and messy. Thus, it is not considered a highly pleasant activity and, as such, is likely to be postponed or ignored to the detriment of the internal combustion engine. In fleet vehicles routine maintenance such as scheduled oil changes may be mandated by fleet operations. While this may ensure that the vehicles are routinely service, it does nothing to reduce or eliminate the time and mess involved in oil change operations. These problems are costly to the fleet owner both in terms of down-time and the necessity to ensure that the oil change procedures and spent oil generated therefrom is conducted and disposed of in an environmentally sound manner.

In previous patents, the present inventor has proposed method whereby oil change operations can be accomplished in a unified, essentially spill-free manner.

In U.S. Pat. No. 5,145,033, the inventor disclosed a sandwich adapter which could be interposed between the engine oil filter and the oil filter mounting boss present on the internal combustion engine to permit removal of engine oil present in the oil filter and to permit introduction of purge gas and flushing fluid through the adapter into the internal lube oil passage system of the internal combustion engine to accomplish removal of residual oil and contaminants from this region. The adapter disclosed therein had a first face adapted to sealingly contact and surround the openings in the internal lube oil passage system which communicated with the filter mounting boss and a second face adapted to sealingly connect with the oil filter unit. The sandwich adapter included a nipple extending through a central through bore in the adapter. The nipple was specifically modified to include a plurality of apertures to facilitate fluid flow from an inlet channel communicating with the exterior of the adapter into the center of the nipple and on to the internal lube oil distribution passages as well as through the filtration media contained in the attached oil filter unit. The flush fluid passing through the oil filter unit progressed in a counter current fashion and was conveyed out of the circuit by a suitable exit line also in fluid communication with the sandwich adapter. While this device and the method disclosed address some of the problems inherent in oil change procedures, the device as disclosed, in some instances was found to be cumbersome to use, particularly in situation in which oil change without reverse (counter current) flush cleaning of the oil filter is all that is required. The adapter was configured to permit removal of residual oil contained in the filter during an oil change operation and to permit introduction of flush fluid there through. That adapter configuration did not permit rapid introduction of total volume of replacement engine oil required during an oil change operation. Additionally the orientation of the inlet and outlet openings as well as the necessary hoses associated therewith makes universal adoption of the sandwich adapter disclosed therein difficult, time consuming and cumbersome due to the space constraints found in many engine configurations.

Other devices have been proposed which address different aspects of the oil change procedure. U.S. Pat. No. 4,433,656 to Norwood discloses an automotive oil filter precharging arrangement which included an adapter interposed between the oil filter and the oil filter mounting boss located on the internal combustion engine. The adapter included a mounting plate, a threaded nipple received in a central through bore onto which the oil filter unit can be attached, and a threaded plug received within a single threaded port in fluid communication with one of the inlet holes also located in the mounting plate. In operation, after a new filter has been attached to the mounting plate, the threaded plug is removed and a small quantity of the fresh oil required in an oil change operation is fed in a non-automated fashion into the oil filter by a funnel, spout, oil pump gun or the like. After the oil filter is charged with oil, the threaded plug must be manually replaced. The oil in the filter was readily available to the engine upon start-up to minimize engine wear.

The Norwood reference does not address the remaining portions of the oil change procedure. Major drawbacks to the process disclosed in the Norwood reference include: (a) the cumbersome nature of the charging process and the risk of oil spillage during oil introduction; and (b) the mounting adapter disclosed in the Norwood reference would be difficult to use in engines having tight clearances and other orientation and space constraints. In order to achieve free orientation of the Norwood adapter relative to the engine, it would be necessary to replace the existing mounting boss nipple with the nipple disclosed in the Norwood reference. In many instances, the mounting boss nipple is permanently or nearly permanently mounted of the existing nipple on the engine. In such instances a device such as the Norwood adapter would be difficult, if not impossible to successfully employ.

U.S. Pat. No. 4,406,784 to Cochran discloses a bypass oil filter adapter which permits the addition of a bypass oil filter in a full flow filter system. The Cochran reference does not address the issues involved in complete oil change operations and optional flush cleaning procedures.

In U.S. Pat. No. 4,909,205 to Bewley, a method and apparatus for changing engine oil is disclosed in which a cylindrical adapter is mounted in fluid contact with the internal combustion engine of a vehicle. The cylindrical adapter disclosed in Bewley is connected to flexible hoses which have male portions of quick connect coupling members at their extremities. The quick connect hoses connect to two mating coupling members located on a second mount separate from the cylindrical adapter to which the oil filter unit is connected. The cylindrical mounting adapter carries a motor-driven reversible-action pump which is connected by a flexible hose to the bottom of the engine oil pan. When the second mount is connected with a suitable plastic container reservoir and the adapter mounted pump is energized, spent oil is removed from the engine to the plastic container. Once the spent oil is removed, a new plastic container filled with fresh oil can be connected and the pump direction reversed to permit replacement of the removed spent oil with fresh engine oil. The method and apparatus are cumbersome and provide several opportunities for oil spillage and the like.

U.S. Pat. No. 4,776,431 to Poling discloses a method for removing spent oil from an internal combustion engine in which the engine oil filter unit is pierced and drained of spent oil. The spent oil contained in the oil pan is drawn out under suction through a suction cup and associated suction conduit placed over the drain opening in the oil pan. This method does not provide for a high speed method for replacing engine oil and does not provide a safe and efficient method for providing an oil change which minimizes the opportunity for oil spillage.

To date, none of the proposed methods and devices provide for the efficient and spill-free removal of spent oil from an internal combustion engine and replacement with fresh material. Gravity removal of spent oil through the drain plug opening is a slow and messy procedure even in the best methods. In conventional methods, the oil is allowed to flow out of the oil pan, through the opened drain plug opening into a collection receptacle under the action of gravity. In other oil change procedures which include enhancements or improvements, the oil is removed by suction through a conduit placed in communication with the oil pan opening. This increases the risk of oil loss through the drain plug and engine destruction due to engine operation without sufficient lubrication.

It would be desirable to provide a convenient, environmentally safe, no-mess alternative to conventional oil changes which reduces the time and labor required in the process and reduces the chances for oil spillage before, during and after the oil change operation. It is also desirable to provide an apparatus and method which provides a unified, streamlined process for oil change operations which supports and complies with the spirit and intent of existing and proposed legislation regarding handling safety waste reduction, pollution abatement and conservation of natural resources. It is also desirable to provide an oil pan adapter device which would eliminate the need for repeated removal and reinsertion of the drain plug with each oil change operation. It is also desirable to provide an oil filter mounting adapter which can be successfully employed in complete oil change operations. Finally, it is desirable to provide an apparatus which can be readily employed on internal combustion engines of varying configurations with minimal change to the engine design or operation.

SUMMARY OF THE INVENTION

The present invention is a process and device for facilitating rapid oil change and optional high speed flush cleaning of any mechanism having a system for lubricating its moveable parts and an associated lube oil filtration system. It is contemplated that the present invention can be successfully, rapidly, and advantageously employed in conjunction with an internal combustion engine having a crankcase and an oil pan.

The apparatus of the present invention generally comprises an oil filter unit mounting adapter which is connected to the internal combustion engine either directly or via a filter mounting boss. The mounting adapter is specifically configured to support automated oil change operations. The filter mounting adapter is suitably configured to permit the sealing, releasable attachment of a suitable oil filter unit thereto. The filter mounting adapter is connected to the engine in a manner which establishes fluid communication between the lube oil distribution passages located in the internal combustion engine and the oil filter unit. The oil filter mounting adapter includes a sandwich adapter having a first face adapted to sealingly contact the filter mounting boss on the internal combustion engine block. The sandwich adapter also has a second face adapted to sealingly connect with the oil filter unit.

The sandwich adapter includes means for conveying engine oil from that mechanism through the oil filter unit and back into the lube oil distribution passages during normal engine operation. The adapter also includes means for introducing fluid through the adapter into the internal combustion engine via the lube oil distribution passages.

The sandwich adapter member preferably permits a spin-on installation and is adapted to be positionable on the filter mounting boss assembly already located on the internal combustion engine. Preferably, the sandwich adapter member is sealingly positionable on the oil filter mounting boss by spinning the adapter onto a suitable nipple extension into sealing engagement with the oil filter mounting boss.

In the preferred embodiment of the present invention, the fluid introduction means in the sandwich adapter has sufficient orientational flexibility to tolerate variations of its orientation depending upon the engineering dimensions and the location of the filter mounting boss in the engine compartment and the space constraints encountered. Preferably, this is accomplished by the presence of a plurality of fluid inlet passages located at spaced intervals on the sandwich adapter member of the present invention. The fluid inlet passages that are not in use are closed with suitable plug members to prevent unwanted ingress or egress of fluid.

The oil filter mounting adapter also includes a quick connect assembly located in one of the fluid inlet passages conveniently positioned when the sandwich adapter is in position to permit introduction of fluid into and through the mounting adapter. The quick connect assembly permits positive closure of the fluid introduction inlet when it is not in use. The quick connect assembly is configured to releasably engage a mating fitting connected to an external fluid source.

The fluid introduction inlet into which the quick connect assembly is mounted may also include a safety check valve located between the quick connect fitting and the mounting adapter proximate to the fluid inlet passage to protect against egress of fluid outward from the mounting adapter.

The device of the present invention may also include a fluid egress fitting releasably connected to the drain plug opening of the oil pan. The fluid egress fitting includes an oil pan adapter member sealingly received in the drain plug opening and a quick connect nipple attached to the oil pan adapter. The quick connect nipple is matingly and sealingly engageable with a fitting located on a fluid egress conduit which is connected to a fluid storage receptacle through a suitable pump means. The fluid egress fitting has a centrally located through bore and means for effecting positive no-spill closure of the fitting when the fitting is disengaged from the mating member. The positive closure means is, preferably, located proximate to the outlet end of the fitting member.

In the oil change and optional flush cleaning operation performed using the apparatus of the present invention, spent or dirty oil is removed from the oil pan by coupling the fluid egress fitting member with a mating fitting located on a suitable externally positioned fluid removal device. Contemporaneous with the coupling of the fluid egress fitting, the fitting located on the oil filter mounting adapter is coupled to an externally positioned device capable of introducing gaseous and liquid fluid materials into the mounting adapter and onto associated lube oil distribution passage system under pressure at will in an automated fashion.

In order to remove residual spent oil remaining in the oil filter and the lube oil distribution passages, an amount of purge gas can be introduced into the oil filter and passage system via the inlet in the oil filter mounting adapter forcing residual oil into the oil pan to be removed therefrom.

Oil removal can be followed by an optional flush cleaning step, if desired. In such instances, the flush fluid is introduced through the oil filter mounting adapter and removed through the fluid egress fitting in the oil pan to a suitable flush fluid storage receptacle. When the optional flush cleaning step is completed, an additional amount of purge gas may be introduced to remove residual flush fluid from the system.

Once spent oil has been removed, the oil filter unit can be replaced, if necessary, and an amount of fresh oil appropriate for the internal combustion engine can be introduced at will in an automated fashion into the engine through oil filter mounting adapter into the lube oil distribution passage system.

BRIEF DESCRIPTION OF THE DRAWING

In the present description reference is made to the following drawing in which like numerals are employed to refer to like elements throughout the various views and in which.

DESCRIPTION OF THE PREFERRED EMBODIMENT

The basic process of the present invention and the apparatus described herein can be employed with vehicles and stationary power plants having internal combustion engines which have oil pans or similar oil reservoirs, internal lube oil distribution passage systems, and at least one oil filter unit. The term "internal lube oil distribution passage system" is defined as, but not limited to, the passages and circulation systems present in the engine block, cylinder head, crank shaft, cam shaft, and connecting rods. Various engines will have differing lubrication requirements. Therefore it is to be understood that every engine may or may not have passages or circulation systems in all of the enumerated components.

THE APPARATUS

Figure 2:
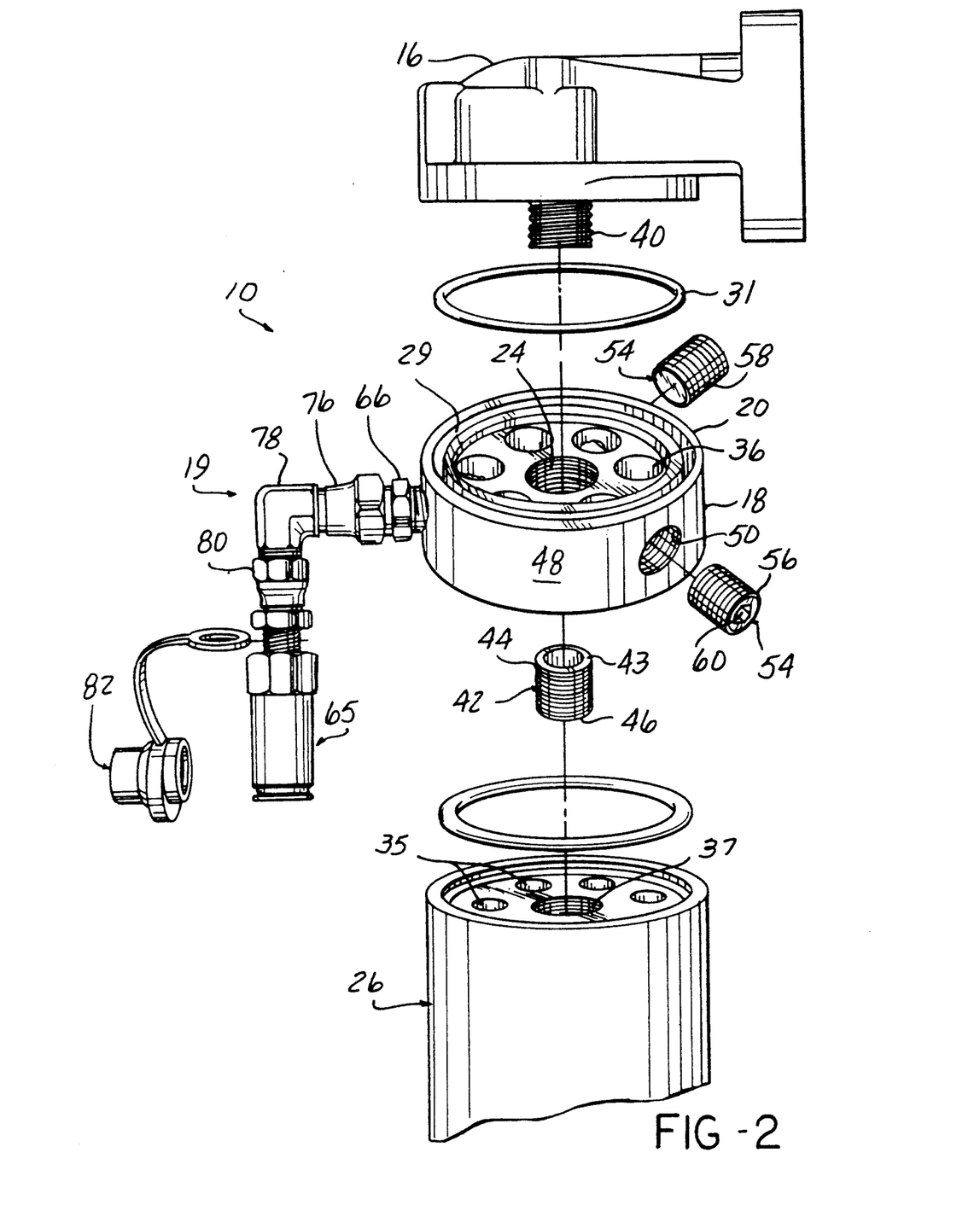
FIG. 2 is an exploded view of the oil filter mounting adapter of the present invention employing the sandwich adapter member of the present invention showing a portion of the associated mounting boss and a suitable oil filter.

The apparatus of the present invention includes an oil filter mounting adapter 10 which is able to be mountable on an internal combustion engine (not shown) so as to establish fluid communication between the internal lube oil distribution passage system 14 located in the engine and the mounting adapter 10. The mounting adapter 10 may be mounted directly to a mounting boss configured in the engine block or, as shown in FIG. 2, the mounting adapter 10 may be releasably mounted to a separate filter mounting boss assembly 16. The oil filter mounting adapter 10 is configured so as to be readily mounted in the position previously configured for receiving an oil filter unit directly in the manner which will be discussed in detail subsequently.

The apparatus of the present invention also includes a fluid egress fitting 110 (shown in FIGS. 5, 6 and 7) releasably and sealingly positioned in the drain plug opening 112 of the oil pan 114. The oil pan 114 is in communication with the internal combustion engine previously described. The fluid egress fitting 110 will be described in greater detail subsequently.

Figure 1:
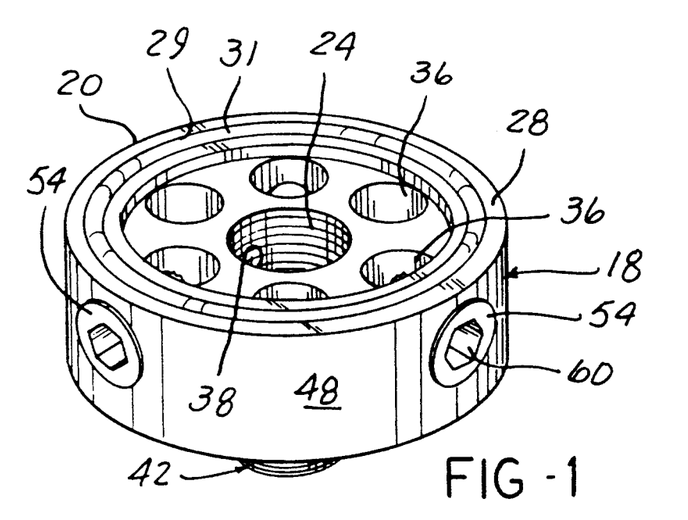
FIG. 1 is a top perspective view of the sandwich adapter member of the oil filter mounting adapter of the present invention.

Turning first to the oil filter mounting adapter 10, the mounting adapter 10 includes a sandwich adapter member 18, shown in FIG. 1, and a fluid coupling fitting assembly 19 releasably connectable with an external pump device. The sandwich adapter member 18, generally has a first, engine-oriented face 20, a second face 22, opposed and parallel to the first face 20, and a central through bore 24, extending through the sandwich adapter 18 from the first face 20, to the second face 22. The second face 22, is oriented toward a suitable oil filter unit 26 which is removably and sealingly attached to the oil filter mounting adapter 10 by suitable mounting means which will be discussed in detail subsequently.

Figure 3:
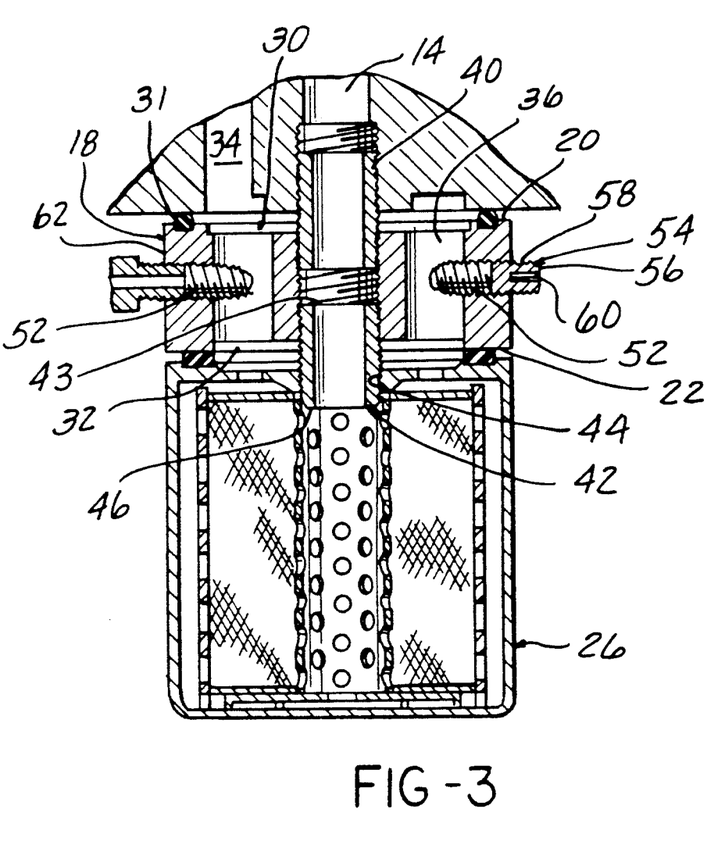
FIG. 3 is a detail cross-sectional view of the sandwich adapter member of the oil filter mounting adapter of the present invention with an oil filter engaged therewith.

As shown in FIGS. 1 and 3, the first engine-oriented face 20, preferably, has an outer annular ridge 28 extending along its outer periphery. The outer annular ridge 28 may also include means for establishing sealing contact between the engine mounting boss assembly 16 and the mounting adapter 10. The sealing means can comprise an annular groove 29 located in the outer annular ridge proximate to its periphery adapted to matingly receive a sealing gasket such as O-ring 31. In order to provide increased tolerance and adaptability to variances in the mounting boss surface, the sealing means can include a sleeve (not shown) adapted to overlie the annular ridge 28 and provide sealing contact between the first face 20 of the sandwich adapter member 18 and the engine mounting boss assembly 16 when placed under compression.

In the preferred embodiment, the sandwich adapter is spun into sealing position relative to the oil filter mounting boss. In order to establish suitable sealing contact when in position, the sandwich adapter is, preferably, fitted with a sleeve or O-ring made of suitable low and high temperature resistant sealing material in order to provide prolonged useful life for the automobile and to permit high mileage accumulation. Suitable materials which can be employed in the sealing material are those which can exhibit sealing qualities at operating temperatures between about $-25°$ C. and about $425°$ C. and are resistant to degradation in an automotive environment at such temperatures. Examples of material suitable for this application include but is not limited to proprietary material commercially available from dupont de Nemours corporation of Wilmington, Del. under the trade name VITON.

The sandwich adapter member 18, preferably has a main fluid collection chamber defined therein. This main collection chamber includes an upper collection chamber 30 located in the first, engine-oriented face 20 interior to the annular ridge 28 and a lower fluid collection chamber 32 located on the second, filter oriented face 22 of the sandwich adapter member 18.

The upper collection chamber 30 has at least one opening in fluid communication with the oil distribution channel 34 which conveys oil from the oil pump generally located in the interior of oil pan 114 to the oil filter unit 26. The oil collection chamber 30 may have any configuration suitable to facilitate the conveyance of engine oil to be filtered into the oil filter unit 26. The lower collection chamber 32, located in the second, filter-oriented face 22, preferably is adapted to overlay oil inlet apertures 35 located in the oil filter unit 26.

Interposed between the two collection chambers 30, 32 is appropriate means for permitting fluid flow from the upper chamber 30 to the lower chamber 32. In the preferred embodiment, the flow permitting means is a plurality of apertures 36 positioned radially around the sandwich adapter member 18 and extending through the adapter member 18 from the first face 22 to the second face 24.

In the preferred embodiment, the sandwich adapter member 18 is mounted to the engine mounting boss assembly 16 in a permanent or semi-permanent manner. The central through bore 24, preferably has an internally threaded inner surface 38 of sufficient inner diameter to engage the downwardly extending threaded member 40 located on the engine mounting boss assembly 16. The sandwich adapter member 18 of the present invention can be threadingly rotated relative to the downwardly extending threaded member 40 into sealing engagement with the engine mounting boss assembly 16. The threading engagement ultimately achieved can be either permanent or semi-permanent in nature. However, it is preferred that a suitable threading adhesive be employed to ensure that the engagement between the two matingly threaded surfaces is sufficiently secure to prevent loosening of the oil filter mounting assembly 10 of the present invention during engine operation or during removal of the oil filter unit 26 during oil change operations.

The sandwich adapter member 18 of the oil filter mounting device 10 of the present invention also includes means for maintaining the oil filter unit 26 in secure, sealed, releasable engagement with the second oil filter oriented face 22 of the adapter member 18. The sandwich adapter member 18 includes a nipple 42 projecting downward from the second filter oriented face 22 having a distal end which is received in a central aperture 35 located in the central region of upper face of the oil filter unit 26.

As shown in FIG. 2, the nipple 42, preferably has an outer threaded surface 43, a first end 44 adapted to be threadingly received in the central through bore 24 of the sandwich adapter 18, and a second end 46 distal to the first end 44 projecting essentially perpendicularly outward from the second face 22 of the sandwich adapter member 18 to threadingly engage the central threaded aperture 37 of the associated oil filter unit 26. The threading engagement ultimately achieved can be either permanent or semi-permanent in nature. However, it is preferred that a suitable threading adhesive be employed to ensure that the engagement between the two matingly threaded surfaces is sufficiently secure to prevent loosening of threaded nipple 42 in the oil filter mounting assembly 10 of the present invention during engine operation or during removal of the oil filter unit 26 during oil change operations.

The sandwich adapter member 18 also has an outer wall member 48 perpendicular to and contiguous with the first and second faces 20, 22 having a plurality of radially positioned apertures 50 defined in a spaced relationship therearound. Each aperture 50 communicates with an associated inlet passage 52. Each inlet passage 52 extends essentially perpendicularly relative to the outer wall member 48 and is oriented between and parallel to the first and second faces 20, 22 of the sandwich adapter 18. Each inlet passage 52 terminates at and is in fluid communication with a respective radially spaced aperture 36. In the preferred embodiment of the present invention, the sandwich adapter member 18 has at least two apertures 50 positioned equidistant around the circumference of the outer wall member 48. The presence of a plurality of apertures 50 at intervals along the circumference of the sandwich adapter member 18 permits the orientation of at least one of the apertures at a convenient location for introduction of selected fluids therethrough once the sandwich adapter 18 is installed in fluid communication with the internal combustion engine. The manner of fluid introduction will be discussed subsequently.

The sandwich adapter of the present invention has at least three apertures 50 to facilitate orientation of at least one of the apertures 50 for optimal fluid ingress. It is preferred that in the sandwich adapter 18 of the present invention have four or more apertures located at spaced intervals on the outer wall member 48 along the circumference of the sandwich adapter member 18.

In order to ensure the fluid integrity of the oil filter mounting device 10 of the present invention, the sandwich adapter member 18 also includes a plurality of removable plugs 54 sealingly contained within the respective apertures 50. Prior to orientation on the engine mounting boss assembly 16, the apertures 50 of the sandwich adapter member 18 of the present invention may each contain a removable plug 54. In the preferred embodiment, each aperture 50 has an internally threaded inner surface adapted to threadingly engage the outer surface of a removable plug 54. The threaded surfaces are matingly received such that a sealing relationship is maintained between the two surfaces.

When mating engagement between the plugs 54 and the sandwich adapter member 18 has been established, the outermost ends 56 of the removable plugs 54 may protrude outward from the surface of the outer wall member 48 as depicted in FIG. 1. The amount of protrusion is an amount less than that which would hamper installation of the sandwich adapter member 18 on the engine mounting boss assembly 16.

Each plug 54, preferably, has a tapered threaded outer surface so that sealing engagement is accomplished as the plug 54 is tightened into the associated aperture 50. While the plugs 54 may protrude as depicted in FIG. 1, it is also within the purview of this invention to have the plugs 54 seated in the associated apertures 50 so that the outermost end 56 is flush with the outer wall member 48 or even depressed in the associated aperture 50 relative to the outer wall member 48.

Each plug 54 includes means for permitting mechanical removal of the plug 54 from engagement with its respective aperture 50. In the preferred embodiment, the removal means comprises a hexagonal indentation 60 extending inwardly from the outermost end 56 of the respective removable plug 54. The indentation 60 has a sufficient width and depth to accommodate a standard hex driver or other appropriate removal tool.

The sandwich adapter member 18 can be held in permanent or semi-permanent engagement with the engine mounting boss assembly 16 by suitable frictional engagement between the respective threads on the central through bore 24 and the threaded member 40 of the engine mounting boss assembly 16. The frictional engagement can be increased by the use of commercially available bonding agents such as those available from the Loctite Corporation of Newington, Conn. or other materials as would be known to one knowledgeable in the art.

The oil filter mounting adapter 10 of the present invention also comprises a fluid coupling fitting assembly 19 in threaded sealing engagement with one of the apertures 50 located on the sandwich adapter 18. Prior to installation on the engine mounting boss assembly 16, the fluid coupling assembly 19 may be separate from the sandwich adapter 18 to facilitate installation. In installing the mounting adapter 10 of the present invention, once the sandwich adapter 18 is in engagement with the engine mounting boss assembly 16, the associated fluid inlet plug 54 can be removed from the associated aperture 50 and the fluid coupling assembly 19 positioned in sealing fluid contact with the sandwich adapter 18 therein.

In this manner, the oil filter mounting adapter 10 of the present invention can be installed on various engines, even those where extremely tight space constraints exist in the engine compartment. Because the oil filter mounting adapter 10 of the present invention exists as two sub-assemblies, the appropriate aperture 50 into which the fluid coupling assembly 19 should be positioned can be determined after orientation of the sandwich adapter 18 on the engine mounting boss assembly 16.

During normal engine operation, the fluid coupling assembly 19 provides a fluid tight seal which prevents the egress of all or substantial amounts of engine oil from the sandwich adapter 16. During oil change and optional engine flush cleaning operations, the fluid coupling assembly 19 provides an inlet for the rapid, essentially spill-free introduction of desired fluids into the internal combustion engine. To accomplish this end, the fluid coupling assembly 19 of the present invention includes at least one single directional flow check valve 76 interposed in the flow stream proximate to the aperture 50 of the sandwich adapter 18 to which the assembly 19 is connected. The single directional flow check valve is, preferably, located in the aperture 50.

The fluid coupling assembly 19, generally, has a first end portion 62 which is threadingly and sealably engageable with the threaded region of one of the apertures 50 in the sandwich adapter 18. A distal or second end portion 64 of the fluid coupling assembly 19 includes means to releasably connect the fluid coupling fitting assembly 19 to a suitable fluid supply hose. The suitable supply hose is in fluid communication with a suitable external fluid supply source capable of supplying fresh oil and/or flushing fluid to the oil mounting adapter 10 of the present invention in the manner which will be described subsequently. In the preferred embodiment of the invention, the means for releasably connecting the fluid fitting assembly 19 to the external supply hose is a quick connect nipple 65 such as that depicted in FIGS. 2 and 4. Such nipples are commercially available from Parker Bruning Corporation of Lincoln, Nebr. In the preferred embodiment, the fluid coupling assembly 19 also includes means for positively closing the coupling assembly when it is not in fluid communication with the external supply hose in a manner which will prevent leakage of any fluid therefrom. Positive closure is preferably attained by employing a quick connect nipple having a positive sealing element. Suitable positive sealing quick connect nipples are commercially available from a variety of sources such as the NO-SPILL series from the Parker Bruning Corporation.

The fluid coupling assembly 19 may have any desirable angular configuration relative to the sandwich adapter member 18 and the oil filter unit 26. In the preferred embodiment, the fluid coupling assembly 19 includes at least one elbow adapter 78 to accommodate the angular orientation of the fluid coupling assembly 19.

Figure 4:
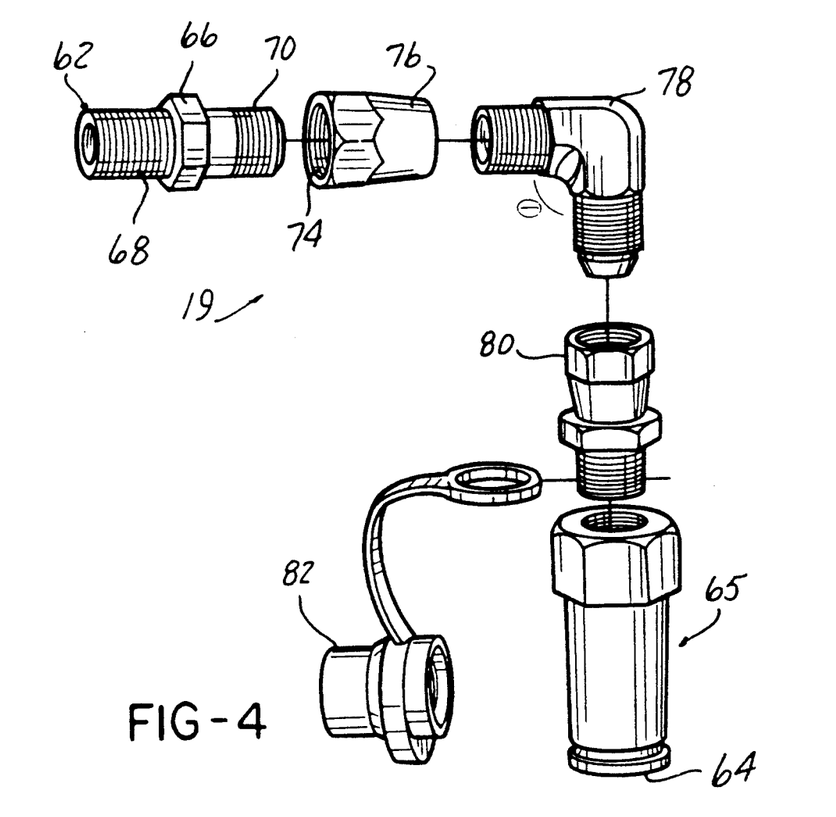
FIG. 4 is a perspective view of the fluid coupler fitting shown in FIG. 2 in exploded form.

As depicted in FIGS. 2 and 4, the fluid coupling assembly 19 has a first leg proximate to the first end portion 62 which extends outward from the sandwich adapter member 18 at an angle essentially perpendicular to the adjacent surface of the outer wall 48. The fluid coupling assembly 19 has a second leg which comprises the quick connect coupling member 65 contiguously joined to the first leg and angularly oriented thereto. As depicted in FIGS. 2 and 4, the second leg is oriented at an angle essentially equal to 90°; however this angle may have any value suitable for facilitation of the oil change procedure once the oil filter mounting adapter 10 is in place.

The fluid coupling assembly 19 also may include means to permit swivel rotation of the fluid coupling assembly 19 relative to the sandwich adapter 18. This swivel means may be a suitable swivel adapter placed in position in the fluid coupling assembly to permit rotation of the fluid coupling assembly 19 relative to the sandwich adapter 18. An additional adapter or adapters may be placed in the fluid coupling assembly 19 to accommodate rotation of the quick connect nipple 65 relative to the fluid coupling assembly 19.

To accomplish the objectives of rotational flexibility, sealing engagement to the sandwich adapter, releasable engagement with an external fluid supply source, and the ability to be useful with tight confines within the engine compartment, the fluid coupling assembly 19 may be composed of several interrelated elements which define a central conduit through which the introduced fluid can pass such as that shown in FIGS. 2 and 4. The fluid coupling assembly 19 which will be discussed is representative of the assemblies which can be employed in the present invention. It is to be understood that the inclusion and relative positioning of the respective elements may be varied within the spirit and teaching of this disclosure.

As shown in the drawing, the fluid coupling assembly includes an adapter-engaging member 66 having a first threaded region 68 adapted to be threadingly received in an apertures 50, 238 of the sandwich adapter 18, an opposed exteriorly threaded region 70 distal to the first threaded region 68, and an intermediate exterior region defined by suitable circumferentially geometrical tool contacting surfaces.

In the preferred embodiment, the opposed exteriorly threaded region 70 is matingly received in a threaded region 74 in a suitable swivel fitting 76 which is, in turn, connected to the first end of an elbow adapter 78. The elbow adapter 78 provides the angular contour to the fluid coupling member discussed previously.

The second end of the elbow adapter 78 can be connected to a suitable swivel fitting 80. The swivel fitting 80, in turn, is connected to a quick connect nipple such as quick connect nipple 65 described previously.

Preferably, the fluid coupling assembly 19 also includes means for protecting the quick connect nipple 65 from abrasion, dirt or other contamination or degradation which would impair the ability of the nipple 65 to form a mating connection with the external fluid supply hose when necessary. The protection means is one which, ideally, would remain in place during routine engine operation and would provide ready access to the quick connect nipple 65 when an oil change is required. In the preferred embodiment of this invention, the protection means is a removable dust cap 82 having a hollow interior into which the outlet end of the quick connect nipple 65 can be inserted. The dust cover 82 is configured to permit sufficiently secure contact between the dust cap 82 and the nipple 65 so that accidental disengagement of the dust cap 82 during normal engine operation is prevented. The means of engagement between the dust cap 82 and the nipple 65 may be suitable means such as mechanical, frictional or combinations thereof.

The oil filter mounting unit 10 of the present invention may be employed in conjunction with single-filter internal combustion engines or with those employing a plurality of oil filter unit arranged in series. When the oil filter mounting adapter 10 of the present invention is employed on internal combustion engines having more than one oil filter unit, the oil filter mounting adapter 10 is preferably inserted in the mounting boss opening closest to the engine oil pump.

Figure 5:
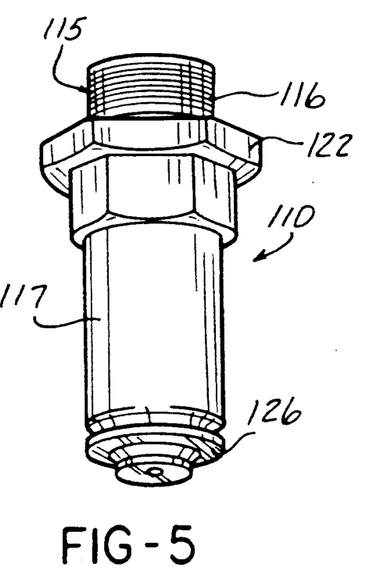
FIG. 5 is a perspective view of the fluid egress fitting of the present invention.
Figure 6:
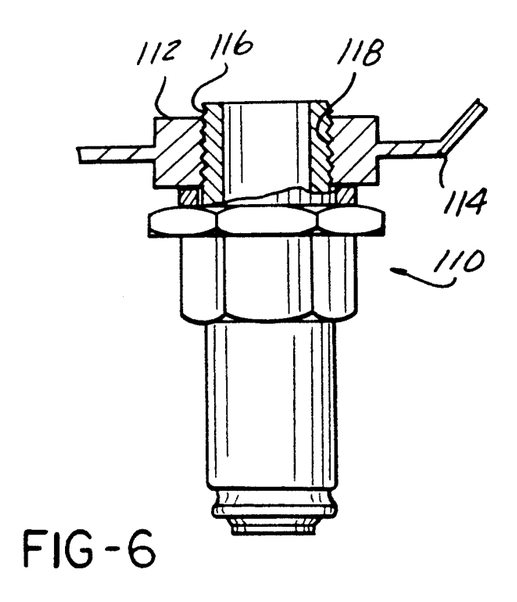
FIG. 6 is a partial cross-sectional view of the fluid egress fitting of FIG. 5 in engagement with the drain plug opening of the oil pan of the present invention.
Figure 7:
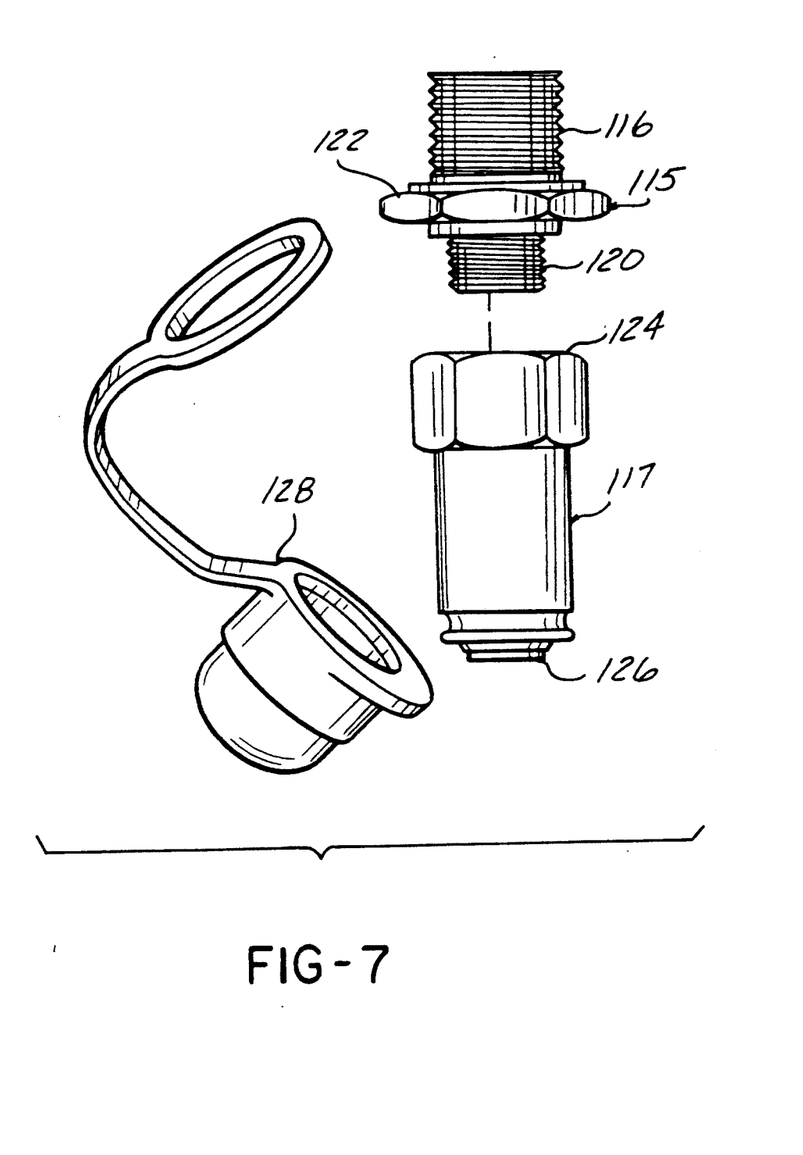
FIG. 7 is an exploded side view of the fluid egress fitting of FIG. 5.

Particularly when performed on large vehicles such as full size trucks, off-road and stationary equipment and the like, the oil filter mounting unit 10 of the present invention may be most advantageously employed in an oil change process performed on an internal combustion engine which has been further modified to include a fluid egress fitting 110 releasably and sealingly positioned in the drain opening 112 of the associated oil pan 114 such as that shown in FIGS. 5, 6 and 7.

The fluid egress fitting 110 of the present invention is a fitting adapted to be matingly and sealingly connected to a suitable external fluid egress hose. The fluid egress fitting 110 of the present invention may be of unitary construction. Alternately, the fluid egress fitting 110 may have a multi-part construction. The fluid egress fitting 110 of the present invention generally has a hollow, internal fluid conveying conduit defined therein and includes means for sealingly connecting the egress fitting 110 to the drain opening 112 of the associated oil pan 114 and a quick connect nipple means for permitting controlled fluid egress. In the embodiment shown in FIGS. 5, 6 and 7, the fluid egress fitting 110 includes an oil pan adapter 115 and a separate quick connect nipple 117 member connected to thereto.

The oil pan adapter 115 has a first threaded region 116 receivable within a mating region 118 in the drain opening 112 of the associated oil pan 114, a second, opposed outwardly threaded fluid outlet region 120 and an intermediately disposed outwardly facing geometric surface 122 defined thereon.

The quick connect nipple 117 has a first end 124 having an inwardly threaded surface (not shown) adapted to matingly and sealingly engage the outwardly threaded surface on the fluid outlet region 120 of the oil pan adapter 115. The quick connect nipple 117 has a second end 126 opposed to the first end 124 which is sealingly connectable with a mating fitting located on an external fluid egress hose.

The fluid egress fitting 110 also includes means for effecting sealing closure of the fluid egress fitting 110 when uncoupled from the mating fitting located on the external fluid egress hose. In the preferred embodiment, the quick connect nipple 117 includes means for effecting positive sealing closure of the fluid egress fitting 110 by employing a positive sealing element therein. Examples of suitable quick connect nipples having positive closure elements are the NO-SPILL series commercially available from the Parker Bruning Corporation.

Preferably, the fluid egress fitting 110 also includes means for protecting the quick connect nipple 117 from abrasion, dirt other contamination or degradative factors which would impair the ability of the nipple 117 to form a mating connection with the external fluid egress hose when necessary. The protection means is one which would remain in place during routine vehicular operation and would provide ready access to the quick connect nipple during oil change operations. In the preferred embodiment, the protection means is a dust cap 128 which can be similarly configured to the dust cap 82.

THE PROCESS

The process of the present invention is directed to a method for removing spent engine oil from a vehicle having an internal combustion engine and replacing the oil which has been removed with fresh engine oil which comprises the following steps:

evacuating residual spent oil contained in the oil filter unit and the internal lube passage system of the engine to the oil reservoir, the spent oil evacuation progressing at will in an automated fashion;

removing spent oil collected in the oil reservoir through the permanent drain opening in the oil pan; and introducing a measured portion of fresh oil into the internal combustion engine through the oil filter mounting assembly of the present invention, the oil introduction occurring at will in an automated fashion.

It is contemplated that the process of the present invention may also include optional flush cleaning steps in which residual oil and contaminants are removed from the engine components and oil pan prior to the introduction of fresh engine oil therein.

In the process of the present invention, the major portion of the spent oil is removed from the oil pan 114 by a positive suction force exerted on the spent oil by external pump device (not shown). The spent oil passes through the fluid egress fitting 110 of the present invention into an external pump out line having a fitting which can be releasably joined to the fluid egress fitting 110. The external pump out line is in fluid communication with the external pump device which can ultimately convey the spent oil to a suitable holding reservoir (not shown) where the spent oil can be held until it can be recycled or disposed of in an environmentally sound manner.

When a thorough crankcase cleaning is not required, an appropriate amount of fresh motor oil can be introduced in an automated fashion into the engine through the conveniently located oil fitting adapter 19 of the oil filter mounting adapter 10 by means of a suitable fill hose which can be releasably connected to the fitting assembly 19. Because the oil filter mounting adapter 10 is in fluid communication with the internal lube oil distribution passage system 14 of the engine, the fresh oil thus introduced passes through the machined passages in the internal lube oil distribution system to lubricate even remote hard to reach surfaces of the moveable engine parts with fresh oil which has passed through the oil filter unit even prior to engine start up. The introduced oil which collects in the bottom of the oil pan 114 is the appropriate quantity for recirculation through the lube oil distribution passage system when the engine is running and the lube oil is recirculating.

The fresh motor oil is, preferably, introduced into the engine compartment under sufficient pressure to the oil distribution passage system and enters the engine compartment to insure that the majority of the engine part surfaces are covered with fresh filtered engine oil. To insure adequate oil coverage, it is preferred that flush fluid introduction pressure be equal to or less than the oil pressure achieved during engine operation. Pumping pressure during addition of the fresh oil is provided by the external pump device.

If desired or required, the oil filter 26 may be changed during the oil change process. This would preferably occur after removal of the spent oil from the crankcase and prior to the introduction of fresh oil.

In the process of the present invention, in order to achieve more efficient removal of spent oil from the engine, the process may also include a step in which residual oil is removed from the oil filter unit 26 and the lube oil distribution passages and added to the spent oil residing in the oil pan 114 before or during the process of removing the oil from the oil pan 114. In the process of the present invention, this is accomplished by the application of gas pressure on the residual oil. The gas is introduced through the inlet located on the oil filter mounting unit 10 of the present invention. Upon the application of gas pressure, residual oil is forced out of the oil filter unit 26 into the internal lube oil passages through to the oil pan 114.

When a complete crankcase flushing is desired, flushing fluid can be introduced in an automated fashion through the oil filter mounting adapter 110 of the present invention through the internal lube oil distribution passage system. The flushing fluid is, preferably, introduced under pressure provided by the external recirculating pump. The pressure with which the flushing fluid is introduced is less than or equal to the pressure achieved by the engine oil pump sufficient to induce a spray pattern as the flushing fluid exits the internal lube oil distribution passage system so that the flushing fluid contacts the surfaces of the engine components and oil pan 114 with sufficient force to dislodge a portion of the residual spent oil and contaminants by mechanical scrubbing action.

The flushing fluid may be introduced before, after, or during the pump-out step. Where the spent oil is extremely viscous, it is desirable to add a portion of the flushing fluid before or during the pump-out step to reduce the oil viscosity by dilution and improve the flow characteristics of the spent oil. Once the oil is diluted or if dilution is not required, the spent oil is pumped out to an appropriate holding tank in the manner described previously. The remaining flushing fluid is introduced to continue the cleaning process.

While a certain amount of residual spent oil and contaminants are removed merely by the mechanical scrubbing action of the spray, additional amounts can be dissolved or removed due to the sheeting action of the flushing fluid as it trickles down the oil pan walls and due to the chemical interaction between the residual spent oil and the flushing fluid.

The flushing fluid introduced is any material or composition which is miscible with motor oil and exhibits suitable detergency and cleaning characteristics but is inert to the oil pan, gaskets, and associated engine components. It is also preferable that the flushing fluid provides sufficient lubricity or sheeting action to enhance the sheeting action of the flushing fluid. The flushing fluid employed is, preferably, one which is compatible with waste oil and is not detrimental in any subsequent waste oil recycling processes and one which does not deposit undesirable residual constituents which adhere to oil pan surfaces and engine components.

In the preferred embodiment, the flushing fluid employed in the present invention consists essentially of a hydrocarbon miscible with engine oil, a compatible detergent capable of improving the detergency of the flushing fluid and a lubricating additive capable of enhancing the sheeting action of the flushing fluid.

The hydrocarbon employed in the preferred embodiment is an organic fluid selected from the group consisting of high flash point kerosene and mixtures thereof. The flash point of the kerosene is preferably above about 150° F. It is to be understood that other fluids having similar characteristics to high flash point kerosene may be employed in admixture or substituted in the flushing fluid.

The detergent employed in the present invention is an organic fluid selected form the group consisting of butyl cellosolve, DOWFAX surfactants, and mixtures thereof. These and similar surfactants are employed in sufficient concentration to provide detergency in the flushing fluid.

The lubricating additive employed in the flushing fluid is, preferably, a methyl ester having a carbon chain between twelve and twenty carbon atoms or mixtures of such methyl esters in an amount sufficient to provide lubricity and sheeting action to the flushing fluid.

In including the lubricating additive in the flushing fluid of the present invention, it was believed that the lubricating additive would impart characteristics which would increase the sheeting action and cleaning characteristics of the flushing fluid. It has been found, quite unexpectedly that the flushing fluid of the present invention also imparts a residual surface lubricity, which is advantageous in that it provides preliminary lubricant to the engine parts as newly added fresh motor oil is added and circulated through the crankcase.

The introduced flushing fluid and residual spent oil accumulate in the lowermost portion of the oil pan 114 during the flushing step. The flushing fluid which accumulates in the lowermost portion of the oil pan 114 can be removed from the oil pan 114 through the fluid egress fitting 110 in the manner described previous in connection with the removal of the spent oil. The pumped-out flushing fluid can be processed to remove the contaminants and particulates dislodged from the engine components and contained in the flushing fluid. The processed flushing fluid may then be recirculated back to the oil filter mounting adapter 10 for reintroduction into the engine. If desired, the quality of the pumped out material can be automatically sampled, analyzed and can be tested or viewed to determine the effectiveness of the cleaning process. Depending on the effectiveness of the cleaning process, the recirculation of flushing fluid continue as long can as necessary until most of the undesirable contaminants have been removed.

Once the desired level of contaminants are removed, the flushing fluid can be conveyed to a suitable waste fluid receptacle for reuse, recycle, or appropriate disposal. If the situation warrants, multiple flushing and recirculation steps can be performed.

Because a small portion of the flushing fluid may remain in the oil filter unit 26 and the internal combustion engine after the greater portion has been removed, the process of the present invention can include an optional post-flush purge step which is accomplished by the introduction of a suitable purge gas through the oil filter mounting adapter 110 of the present invention into the internal combustion engine. The purge gas is introduced under sufficient pressure to push at least a portion of the residual solvent into the oil pan 114 where it can be removed through the fluid egress fitting 110 into the connected pump out hose.

The introduced purge gas is one which is capable of volatilizing and/or mechanically carrying residual solvent out of the oil filter unit and the internal lube oil distribution passage system. In the preferred embodiment, the purge gas is anhydrous, and essentially chemically non-reactive with the flushing fluid, spent oil, etc. Suitable materials are selected from the group consisting of compressed air, nitrogen, nobel gasses, and mixtures thereof.

After flushing fluid has been removed, the oil filter unit 26 or units can be replaced with new units as desired, the pump out hose can be uncoupled from the fluid egress fitting 110 and the fresh engine oil can be added in an automated manner to the engine through the oil filter mounting adapter 10 of the present invention. Once the appropriate amount of fresh oil has been added, the fluid introduction hose can be uncoupled from the fluid coupling assembly 19 and normal engine operations can be resumed.

In this manner an internal combustion engine can be easily and effectively and conveniently retrofitted to permit efficient, economical, and environmentally safe oil change and optional engine cleaning operations to be accomplished.

What is claimed is:

1. A system for changing oil for an internal combustion engine that is adapted for rapid and automatic fluid transfer into and out of the engine from an external source, the internal combustion engine comprising:
    an engine block defining a crankcase and an internal lube oil passage system;
    an oil filter mounting boss located on said engine block;
    an oil filter unit in fluid communication with said internal lube oil passage system;
    an oil pan attached to the internal combustion engine in fluid communication with said oil filter unit and said crankcases, said oil pan having a drain opening;
    the system for changing oil for the internal combustion engine comprising:
    a fluid egress assembly; and
    a fluid ingress assembly
    said fluid egress assembly engageable in the drain opening, said fluid egress assembly comprising:
    an oil pan adapter portion having an essentially cylindrical body having a first region adapted to sealingly contact the drain plug opening of the oil pan, a second region distal from said first region, and a through bore extending longitudinally through said cylindrical body;
    a quick connect nipple portion having an essentially cylindrical body having a first region connected to said second region of said oil pan adapter, said quick connect nipple further having a second region adapted to releasably mate with an externally positionable fluid egress fitting and a through bore extending longitudinally through said cylindrical body;
    means for positively closing said fluid egress assembly against fluid egress when said quick connect nipple is disengaged from said externally positionable fluid egress fitting; and
    a cap releasably overlaying said quick connect nipple when said nipple is disengaged from said externally positionable fluid egress fitting;
    wherein said second region of said oil pan adapter portion further includes a plurality of outwardly oriented threads positioned proximate to an outer distal fluid outlet located therein and said first region of said quick connect nipple portion further includes an inwardly threaded region adapted to matingly engage with outwardly oriented threads of said second region of said oil pan adapter portion;
    said fluid ingress assembly comprising:
    means interposed between said oil filter mounting boss and said oil filter unit for receiving and conveying fluid into said internal lube oil passage system through said engine crankcase to said oil pan;

wherein said fluid receiving and conveying means is an oil filter mounting adapter, said oil filter mounting adapter comprising:

a sandwich adapter having a first face adapted to sealingly contact a filter mounting boss and communicate with the internal lube oil passage system in the internal combustion engine, a second face adapted to sealingly contact an associated oil filter unit, and an outer wall member disposed between said first and said second faces and perpendicularly attached thereto, said sandwich adapter having at least one oil entry opening in communication with the internal lube oil passage system of the internal combustion engine, at least one oil collection chamber proximate to said engine mounting boss, at least one engine oil exit opening proximate to said oil filter unit, a central through bore extending laterally through said sandwich adapter from said first face to said second face, a plurality of fluid transfer channels extending laterally through said oil collection chamber to said engine oil exit opening, and a plurality of apertures located in spaced annular relationship to one another in said outer wall member, said apertures each defining an associated longitudinal fluid transfer channel, said longitudinal fluid transfer channels each terminating in fluid communication with said one of said lateral fluid transfer channels defined in said sandwich adapter;

a plurality of removable plugs, each removable plug positioned in an associated outer wall aperture;

at least one fluid coupling assembly sealingly positionable in said associated outer wall aperture;

means for connecting said sandwich adapter to said oil filter mounting boss;

means for attaching said oil filter unit in contact with said second face of said sandwich adapter; and at least one check valve located proximate to and in fluid contact with said fluid coupling assembly;

wherein said fluid coupling assembly of said oil filter mounting comprises:

a connector member having an outer housing and a central fluid conveying conduit located therein, said connector member having a first end and a second end distal thereto, said first end engageable with an associated one of said outer wall apertures;

a second quick connect nipple connected to said second end of said connector member, said second quick connect nipple having an inlet end releasably engageable with a mating quick connect fitting positioned on an externally located fluid delivery device;

said second quick connect nipple further comprising means for establishing fluid tight closure of said fluid coupling member when said second quick connect nipple is disengaged from said fluid delivery source.

* * * * *

UNITED STATES PATENT AND TRADEMARK OFFICE
CERTIFICATE OF CORRECTION

PATENT NO. : 5,327,862
DATED : July 12, 1994
INVENTOR(S) : Ram D. Bedi

It is certified that error appears in the above-indentified patent and that said Letters Patent is hereby corrected as shown below:

Column 1, line 43, please delete "service" and insert --serviced--.

Column 2, line 14, please delete "situation" and inse --situations--.

Column 6, line 56, after "19" please insert --(FIG. 2)--.

Column 6, line 58, after "22" please insert --(FIG. 3)--.

Column 7, line 28, please delete "is" and insert --are--.

Column 12, line 52, after "dirt" please insert --,--.

UNITED STATES PATENT AND TRADEMARK OFFICE
CERTIFICATE OF CORRECTION

PATENT NO. : 5,327,862
DATED : July 12, 1994
INVENTOR(S) : Ram D. Bedi

It is certified that error appears in the above-indentified patent and that said Letters Patent is hereby corrected as shown below:

Column 14, line 66, please delete "form" and insert --from--.

Signed and Sealed this

First Day of November, 1994

*Attest:*

BRUCE LEHMAN

*Attesting Officer*    *Commissioner of Patents and Trademarks*